US010270922B2

(12) United States Patent
Kaneko

(10) Patent No.: US 10,270,922 B2
(45) Date of Patent: Apr. 23, 2019

(54) MANAGEMENT SYSTEM AND MANAGEMENT METHOD

(71) Applicant: CANON KABUSHIKI KAISHA, Tokyo (JP)

(72) Inventor: Tsuyoshi Kaneko, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/003,464

(22) Filed: Jan. 21, 2016

(65) Prior Publication Data

US 2016/0219167 A1   Jul. 28, 2016

(30) Foreign Application Priority Data

Jan. 28, 2015 (JP) ................. 2015-014650

(51) Int. Cl.
 G06F 3/12 (2006.01)
 H04N 1/00 (2006.01)
 G06Q 10/08 (2012.01)

(52) U.S. Cl.
 CPC ......... *H04N 1/00344* (2013.01); *G06F 3/121* (2013.01); *G06F 3/1229* (2013.01); *G06F 3/1287* (2013.01); *G06Q 10/087* (2013.01); *G06Q 10/0875* (2013.01); *H04N 1/00037* (2013.01); *H04N 1/00074* (2013.01); *H04N 1/00244* (2013.01); *H04N 2201/0094* (2013.01)

(58) Field of Classification Search
 None
 See application file for complete search history.

(56) References Cited

U.S. PATENT DOCUMENTS

| 2004/0126123 A1* | 7/2004 | Koga ................ G03G 15/0863 399/24 |
| 2009/0112738 A1 | 4/2009 | Nagata |
| 2012/0328306 A1* | 12/2012 | Kaneko ............... G03G 15/556 399/8 |
| 2014/0023382 A1* | 1/2014 | Kawana ............... G03G 15/556 399/8 |

FOREIGN PATENT DOCUMENTS

| CN | 102591166 A | 7/2012 |
| CN | 103020789 A | 4/2013 |
| CN | 104220998 A | 12/2014 |
| JP | 2010-181720 A | 8/2010 |
| JP | 2013030153 A | 2/2013 |
| JP | 2014052417 A | 3/2014 |

* cited by examiner

*Primary Examiner* — Huo Long Chen
(74) *Attorney, Agent, or Firm* — Canon U.S.A., Inc. IP Division

(57) ABSTRACT

A management system is configured to manage a stock of a consumable product and includes a setting unit configured to set a type of a notification used in stock management when an image processing apparatus is a management target, a determination unit configured to determine whether a type of an alarm corresponding to a notification related to the consumable product generated by the image processing apparatus serving as the management target, matches the set type of the notification used in the stock management, and a stock management unit configured to manage the stock of the consumable product in accordance with the alarm that has been determined to have the type matching the set type of the notification used in the stock management.

6 Claims, 10 Drawing Sheets

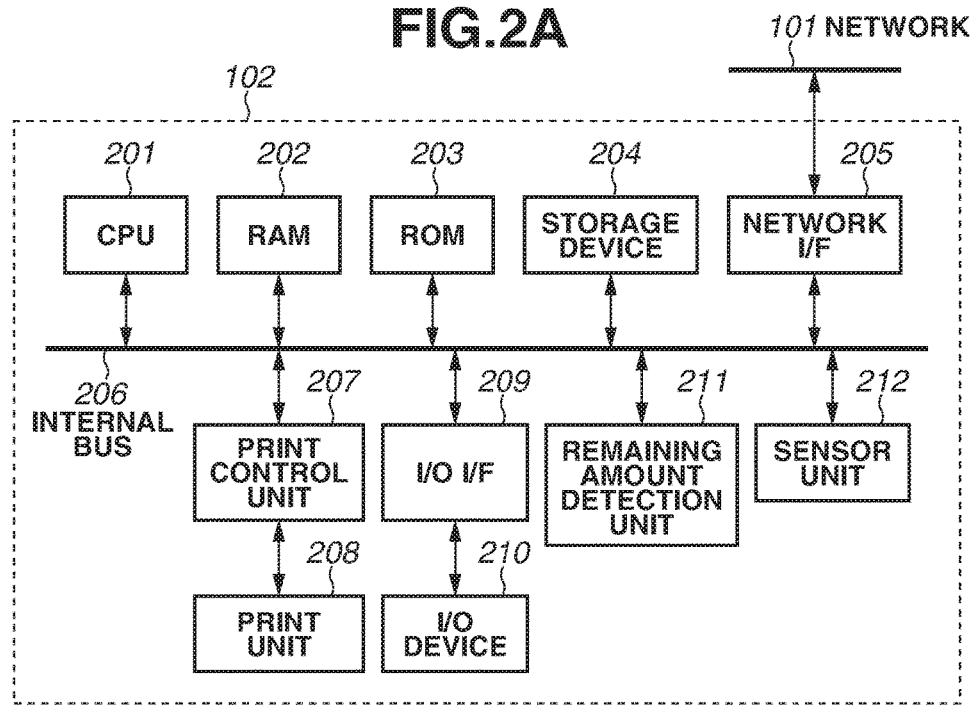
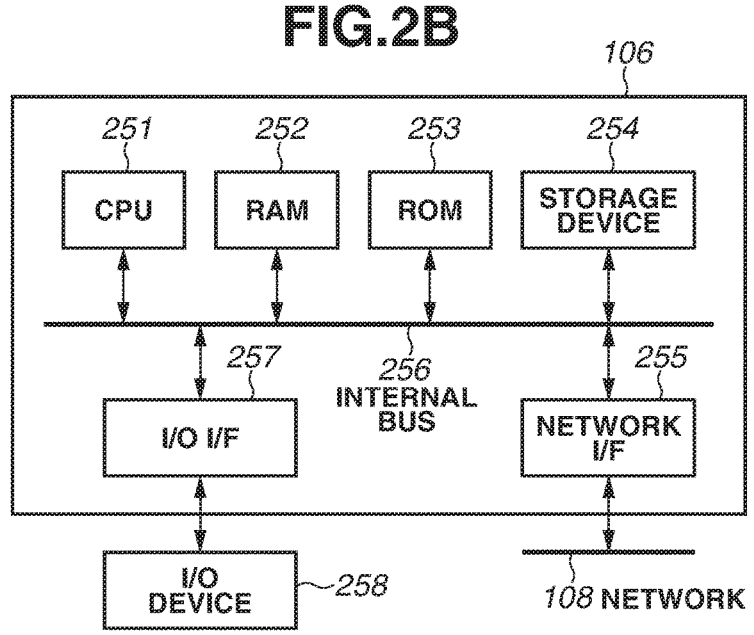

FIG. 5

DETAIL OF DEVICE INFORMATION

◀ BACK

| REGISTER | SAVE | COPY | | DELETE |

ITEMS WITH ✱ MARK MUST BE FILLED.
ITEMS WITH + MARK ARE ALSO USED IN Customer Portal.

✱ ON/OFF: ON ▼

BASIC INFORMATION

✱ CUSTOMER NAME: CUSTOMER 1 ▼

✱ CONTRACT NUMBER: Contract1 ▼

✱ SERVICE TYPE: Advanced ▼

✱ TIME ZONE: Japan ▼

✱ DEVICE ID: DEV00001 ▼ [ACQUIRE PRODUCT NAME]

✱ PRODUCT NAME: MFPxxxx ▼

+ DEVICE NAME:

✱ SELECT TONER/INK TO BE USED: ≪

Black: Canon T12 Black Toner ▼

Cyan: Canon T12 Cyan Toner ▼

Magenta: Canon T12 Magenta Toner ▼

Yellow: Canon T12 Yellow Toner ▼

ALARM FOR TONER MONITORING: PRELIMINARY TONER-LOW ALARM ▼

| LATEST DETECTED DATA AND TIME | SERIAL NUMBER |
|---|---|
| 2014/10/12 13:46 | SERIAL0003 |
| 2014/07/05 09:34 | SERIAL0002 |
| 2014/03/14 14:28 | SERIAL0001 |

600 REPLACEMENT HISTORY TABLE

FIG.6B

COUNTER NUMBER 1 x x ⇒ NEW CONSUMABLE PRODUCT DETECTED

COUNTER NUMBER 2 x x ⇒ REUSABLE DETACHMENT DETECTED

COUNTER NUMBER 3 x x ⇒ UNIDENTIFIABLE CONSUMABLE PRODUCT DETECTED

FIG.6C 1 x x x x x – 01 x x ··· NEW 1 x x x x x – 02 x x ··· REUSABLE DETACHMENT 1 x x x x x – 03 x x ··· UNIDENTIFIABLE

FIG.6D

| DEVICE ID | DEV00001 |
|---|---|
| PRODUCT NAME | MFPxxxx |
| IP | X. X. X. X |
| MAC | macxxxxxxxx1 |
| ... | ... |
| ALARM FOR DECREMENTING | TBC ALARM |

610 MANAGEMENT TABLE

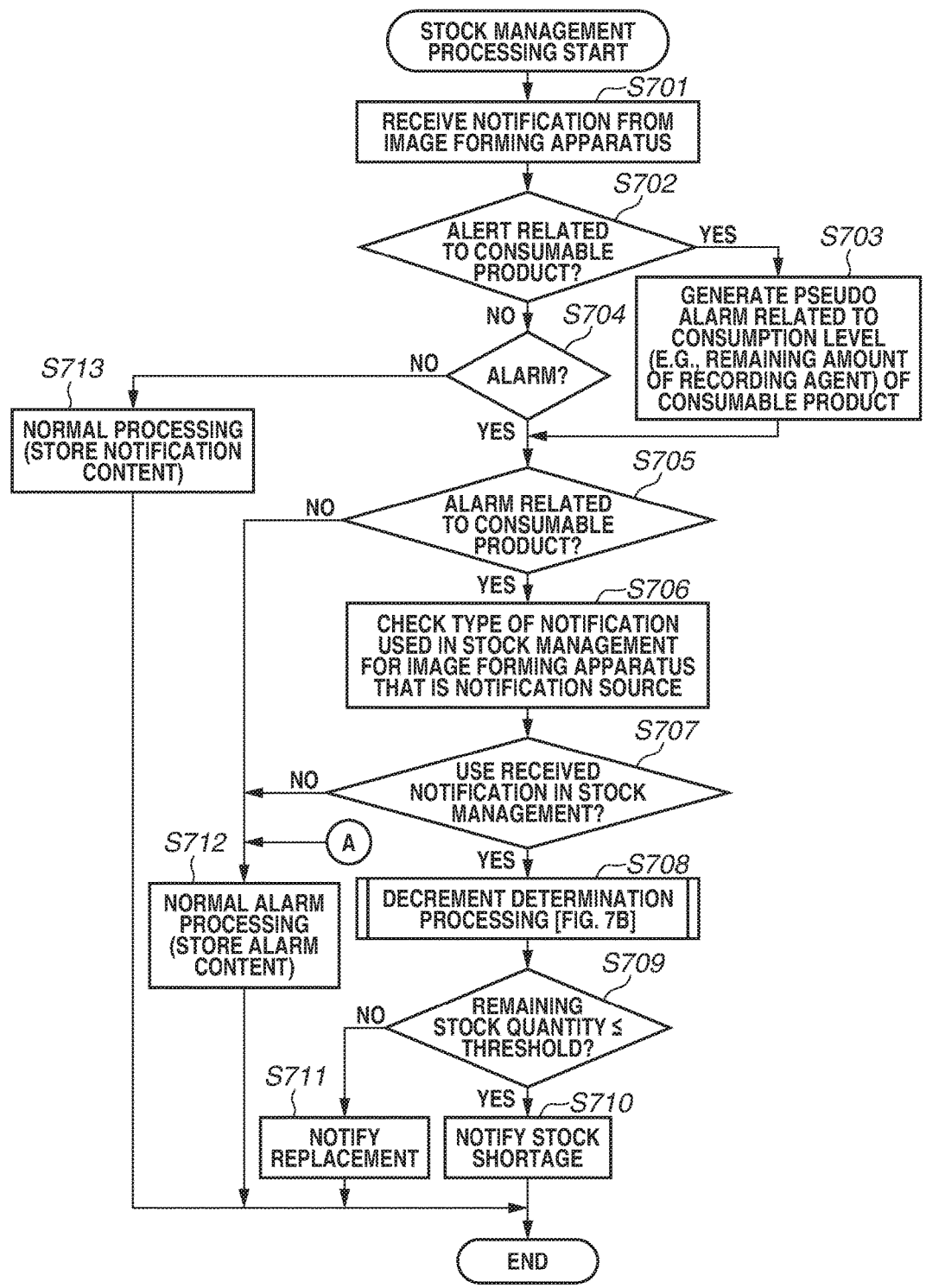

FIG.8

PRESS [SEARCH] BUTTON IN "FAILURE/COMMUNICATION TEST INFORMATION" AGAIN TO CANCEL SELECTED STATE OF DEVICE ID. 1 THROUGH 100 OF 1000

| CUSTOMER NAME | PRODUCT NAME | DEVICE ID | RDS ID | RECEIVED DATE AND TIME | SALES ORGANIZATION NAME | COMMUNICATION TYPE | STATUS | TOTAL COUNTER VALUE | REFERENCE NUMBER | DETAIL |
|---|---|---|---|---|---|---|---|---|---|---|
| Customer | SFPxxxx | ○ DEV000002 | ne0000002 | 2014-11-08 18:11 (+09:00) | Company | ERROR (ON-SITE SERVICE REQUIRED) | ☐ UNPROCESSED | 1900 | 2121100886000000 | DETAIL |
| ▼ | Exxx 000x (2014-11-08 18:11) ROM ERROR | ABNORMALITY FOUND IN CHECK SUM VALUE OF ROM DATA | | | | | | | | |
| Customer | MFPxxxx | ○ DEV00012 | DEV00012 | 2014-11-01 09:11 (+09:00) | Company | TONER REPLACEMENT | ☐ UNPROCESSED | 1200 | 2121100887000000 | DETAIL |
| | 1xxxxx 00000000 (2014-11-01 09:11) TONER-LOW PSEUDO ALARM (BLACK) | | | | | | | | | |
| Customer | MFPxxxx | ○ DEV00013 | DEV00013 | 2014-10-28 18:21 (+09:00) | Company | TONER REPLACEMENT — 801 | ☐ UNPROCESSED | 1500 | 2121100887100000 | DETAIL |
| | 1xx100 000001xx (2014-10-28 18:21) TONER-BOTTLE COUNTER UP ALARM (BLACK) (SERIAL#) | | | | | | | | | STOCK |
| Customer | MFPxxxx | ○ DEV00013 | DEV00013 | 2014-09-22 16:25 (+09:00) | Company | OTHER (TONER RELATED ALARM) | ☐ UNPROCESSED | 1000 | 2121100886200000 | DETAIL |
| | 1xx17 00000000 (2014-09-22 16:25) PRELIMINARY TONER-LOW ALARM (BLACK) | | | | | | 802 | | | |

FIG.9

| STOCK STORAGE LOCATION | TONER/INK SERIAL NUMBER | TONER/INK MERCURY CODE | PRODUCT NAME | NUMBER OF REGISTERED DEVICES | INITIAL STOCK QUANTITY | MAXIMUM STOCK QUANTITY | NOTIFICATION TRIGGERING STOCK QUANTITY | RATIO OF AVERAGE NUMBER OF USED SHEETS TO NOMINAL NUMBER OF PRINTABLE SHEETS (AVERAGE NUMBER OF USED SHEETS/ NOMINAL NUMBER OF PRINTABLE SHEETS) |
|---|---|---|---|---|---|---|---|---|
| Customer 35 OFFICE ROOM | Bottle K | 3845A | MFPxxxx | 3 | 7 | 7 | 2 | 97% (14550/15000) |

901

LATEST 30

| CATEGORY (PROCESSING CODE) | PRODUCT NAME | DEVICE ID | DATE AND TIME | QUANTITY | TOTAL STOCK QUANTITY | TOTAL COUNTER VALUE | DIFFERENCE IN COUNTER VALUE FROM LAST REPLACEMENT |
|---|---|---|---|---|---|---|---|
| TONER REPLACEMENT | MFPxxxx | MPQ00057 | 2014-07-17 14:56 | -1 | 4 | 925214 | 14080 |
| TONER REPLACEMENT (SERIAL NO 5) | MFPxxxx | EAQ00016 | 2014-07-16 13:23 | -1 | 4 | 8242 | 14024 |
| TONER REPLACEMENT | MFPxxxx | MPQ00057 | 2014-06-10 14:14 | -1 | 5 | 920354 | 729 |
| TONER REPLACEMENT (SERIAL NO 4) | MFPxxxx | EAQ00016 | 2014-06-10 15:58 | -1 | 5 | 68218 | 13960 |
| TONER REPLACEMENT | MFPxxxx | MPQ00057 | 2014-06-07 18:44 | -1 | 6 | 919625 | 16043 |
| REFILL |  |  | 2014-05-28 08:59 | 5 | 7 |  |  |

902

903

MANAGEMENT SYSTEM AND MANAGEMENT METHOD

BACKGROUND OF THE INVENTION

Field of the Invention

The present invention relates to a technique of managing one or more image processing apparatus(es) by using operation information transmitted from the image forming apparatus(es) through network communications.

Description of the Related Art

Conventionally, management systems have been available that manage information related to a state and a consumable product of an image processing apparatus in a network environment for a plurality of customers. In the management system, stock management has been performed for a consumable product, such as a toner cartridge and a toner bottle used by the customer, based on a signal (notification content) that is related to the consumable product and is transmitted from the image processing apparatus though a network such as the Internet. Specifically, the stock management features the following processing on the side of the management system: the quantity of replaceable consumable products, stocked on the side of the customer, is managed, and when it is determined that the stock quantity of the consumable product is small or none, an arrangement is made for delivering the consumable product to the customer.

Currently, the following mechanism has been established to implement the stock management for consumable products in the management system. More specifically, the image processing apparatus detects a remaining toner amount and notifies a management server of a detection result at various timings with a signal serving as an alert or an alarm. Furthermore, a mechanism has been proposed in which, upon determining that the consumable product has been replaced with a new one based on results of detection by an attachment/detachment sensor and remaining amount detection, the image processing apparatus transmits a signal indicating the replacement to the management server.

In this context, a technique has been available in which a serial number is detected from a tag on a toner cartridge, so that the replacement of the toner cartridge with the new one can be accurately determined in the image processing apparatus (for example, Japanese Patent Application Laid-Open No. 2010-181720).

The management system needs to perform the stock management while taking into account the fact that a transmittable signal, related to the consumable product, might differ in type and content among the models of the image processing apparatus. Furthermore, a mechanism that can implement more flexible stock management applicable to various conditions of use of the image processing apparatus of the customer, contents of a contract concluded with the customer, time periods required for the delivery depending on the location (position on a map) of an installed environment of the customer, and the like.

The condition of use of the image processing apparatus of the customer includes a condition where the customer constantly and continuously uses the image processing apparatus to perform mass printing, a condition where the customer uses the image processing apparatus for general office use, and the like. The contract concluded with the customer may include various terms and conditions. More specifically, according to one contract, every time the consumable product is used up, an arrangement is made for delivering a new consumable product to a customer with no space to stock the consumable product in the customer environment (stockless). According to another contract, an arrangement is made for delivering a new consumable product in such a manner that a predetermined number of new consumable products are constantly stocked in the stock space in the customer environment.

In the customer environment, a consumable product, such as a toner bottle, attached to the image processing apparatus might be detached in a half-used state with the contained consumable agent still remaining. An act of attaching a half-used consumable product, detached from an apparatus, to another apparatus should not be regarded as the replacement with a new one. Considering such an example, the stock quantity needs to be decremented while taking into consideration a special replacement operation depending on how the customer uses the image processing apparatus.

SUMMARY OF THE INVENTION

The present invention is directed to provision of a management method for managing consumable stock.

A management system according to the present invention is configured to manage a stock of a consumable product used in an image processing apparatus and includes a setting unit configured to set a type of a notification used in stock management when an image processing apparatus is a management target of the management system, a determination unit configured to determine whether a type of an alarm corresponding to a notification related to the consumable product generated by the image processing apparatus serving as the management target matches the set type of the notification used in the stock management, a stock management unit configured to manage the stock of the consumable product in accordance with the alarm that has been determined to have the type matching the set type of the notification used in the stock management, and a providing unit configured to execute a notification in accordance with a remaining stock quantity of the consumable product. The stock management unit is configured not to decrement the remaining stock quantity of the consumable product in accordance with the alarm, when the type of the notification, used in the stock management, corresponds to a notification indicating replacement of the consumable product, and the alarm does not include information indicating replacement with a new consumable product. The stock management unit is configured to decrement the remaining stock quantity of the consumable product in accordance with the alarm when the type of the notification, used in the stock management, corresponds to a notification indicating replacement of the consumable product, and the alarm includes information indicating replacement with a new consumable product. The stock management unit is configured to decrement the remaining stock quantity of the consumable product in accordance with the alarm when the type of the notification, used in the stock management, corresponds to a notification indicating a consumption level of the consumable product.

Further features of the present invention will become apparent from the following description of exemplary embodiments with reference to the attached drawings.

BRIEF DESCRIPTION OF THE DRAWINGS

FIGS. 2A and 2B are each a diagram illustrating an example of a hardware configuration of each apparatus according to the present invention.

FIG. 5 illustrates an example of a screen for setting information, related to an image processing apparatus, provided by the management server.

FIGS. 6A to 6D are each a diagram illustrating information required for stock management for a consumable product.

FIGS. 7A and 7B are each a flowchart illustrating processing related to the stock management performed by the management server.

FIG. 8 illustrates an example of a screen, displaying a history of notifications related to the consumable product, provided by the management server.

FIG. 9 illustrates an example of a screen, indicating a usage state of the consumable product, provided by the management server.

DESCRIPTION OF THE EMBODIMENTS

First of all, terms used in the present invention will be defined.

Consumable products, serving as stock management targets in a management system according to the present invention, include a recording agent supplier that is attached to an image processing apparatus and can supply a recording agent for image forming. Such a recording agent supplier includes a toner bottle, an ink bottle, a toner cartridge, and the like. The consumable products further include consumable components that are consumed through repeated processing such as the image forming in the apparatus. The image processing apparatus described above includes an apparatus that performs image forming such as a digital multifunction peripheral (MFP), a facsimile apparatus, a laser beam printer, or an inkjet printer. The image processing apparatus further includes a digital medical device, a network camera, an on-vehicle device, a robot, certain types of household electric appliances, and the like that include consumable components.

Notifications related to a consumable product, transmitted from an image processing apparatus to a management system, include a notification related to the consumption level of the consumable product (for example, a notification related to the remaining amount of a recording agent or a notification indicating the consumption level of a consumable component) and a notification related to replacement of the consumable product. The content of these notifications may include information indicating a date, identification information of an apparatus, counter information related to image forming counted in the apparatus, and the like.

A first exemplary embodiment of the present invention is described below with reference to the drawings.

Figure 1:
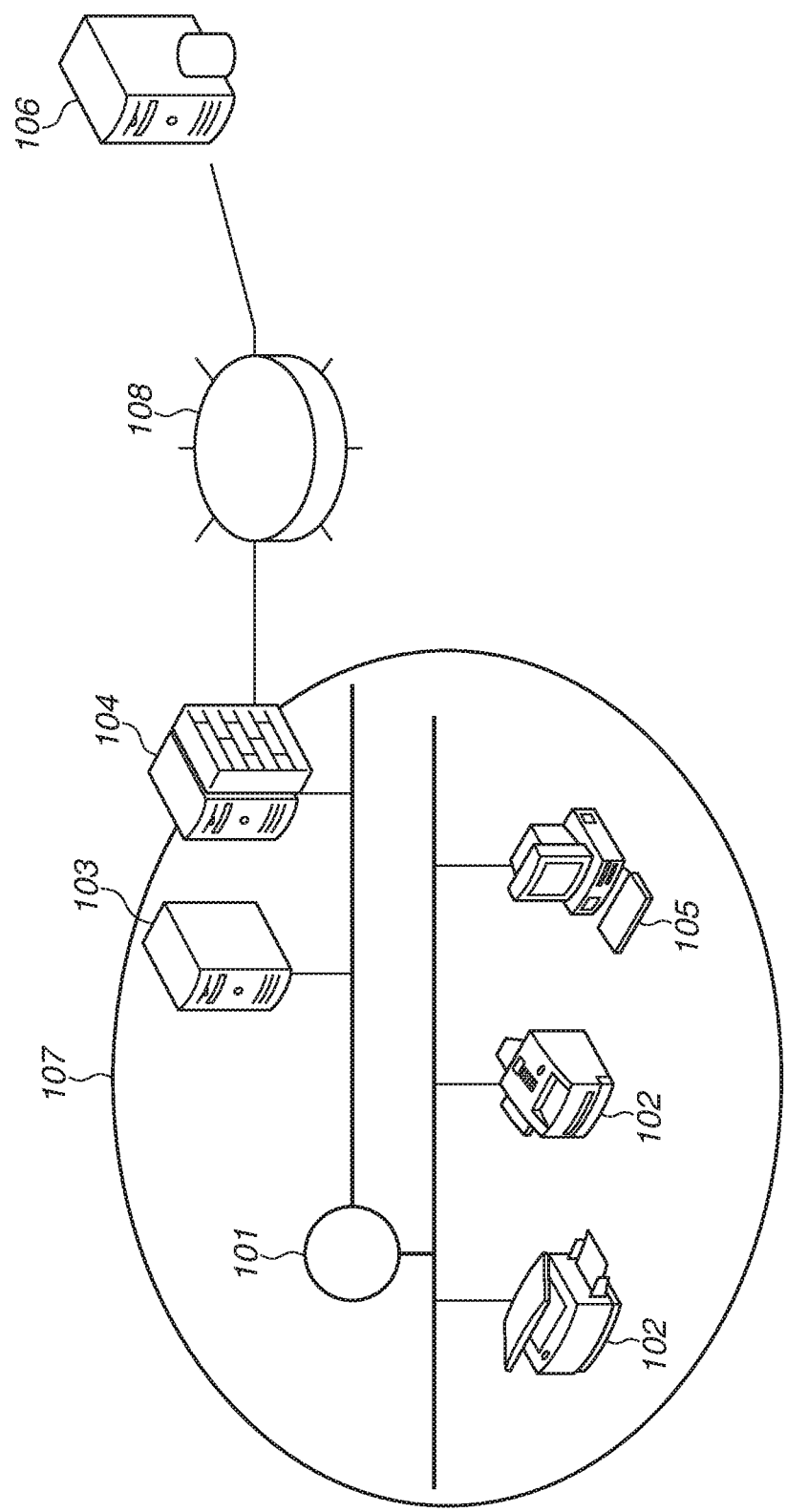
FIG. 1 is a diagram illustrating an example of an overall configuration of a network system according to the present invention.

FIG. 1 is a diagram illustrating an example of an overall configuration of a network system according to the present invention. The network system includes an image processing apparatus, a monitoring apparatus that monitors the image processing apparatus, and a management system including a management server that communicates with the monitoring apparatus.

In the figure, an image processing apparatus 102, a proxy server 103, a firewall 104 provided to improve security of an intranet environment 107, and a personal computer (PC) 105 used by a general user for business and the like are connected to each other through a local area network (LAN) 101 in the intranet environment 107. The intranet environment 107 is equivalent to a customer environment serving as a management target of the management system. The customer environment is a network environment for a customer with an environment including the image processing apparatus managed by the management system. The intranet environment 107 may include a plurality of different image processing apparatuses 102 of different models. The intranet environment 107 may further include a PC 105 used by a manager in charge of the overall management of apparatuses on the network in the customer environment.

The management server 106 in the management system can perform bidirectional communications with a plurality of intranet environments 107 through the Internet 108. The management server 106 may be implemented by a single server machine or may be implemented by a technique such as virtualization on a plurality of server machines. The management server 106 and the image processing apparatus may be connected to each other through a relay apparatus (not illustrated) for relaying a management operation performed therebetween. The relay apparatus may execute processing described below such as processing of generating a pseudo alarm.

The management server 106 manages customer information and device information. The customer information indicates a customer serving as the management target and information indicating a contract concluded with the customer. The device information indicates identification information, a model, and the like of one or more image processing apparatus(es) used by each customer. The management server 106 has a function of receiving from the image processing apparatus 102, counter information, failure information, and the like of the apparatus, and centrally managing an operation state based on the pieces of information. The management server 106 also has a stock management function for a consumable product executed with a notification related to the consumable product received from the image processing apparatus 102. The management server 106 may be connected to the PC (not illustrated) used by the manager to manage the management system. Thus, the management server 106 further has a function of providing the customer information, the device information, information required for the stock management, and the like to the external PC for the manager by using, for example, a web page, an e-mail, or the like.

A communication protocol, which is HTTP, HTTPS, or the like in the present exemplary embodiment, is not particularly limited. For example, in the example illustrated in FIG. 1, the image processing apparatus 102 transmits data to the management server 106 through the proxy server 103 and the firewall 104 under HTTPS.

FIG. 2 is a diagram illustrating an example of a hardware configuration of each apparatus according to the present invention.

FIG. 2A is a diagram illustrating an example of a hardware configuration of the image processing apparatus 102. The image processing apparatus 102 includes a central processing unit (CPU) 201, a random access memory (RAM) 202, a read only memory (ROM) 203, a storage device 204, a network interface (I/F) 205, an internal bus 206, a print control unit 207, and a print unit 208 including a fixing device and the like.

The CPU 201 collectively controls the devices through the internal bus 206 with a program stored in the ROM 203. The ROM 203 further stores destination information indicating a shipping location of the image processing apparatus 102. A language displayed on an input/output (I/O) device 210 is determined in accordance with the destination information. The RAM 202 functions as a memory and a work area of the CPU 201. The network I/F 205 is in charge of unidirectional or bidirectional transmission of data to and/or from an external network device or PC through the LAN 104. The print control unit 207 controls the print unit 208. The CPU 201 executes a program with the RAM 202 and the ROM 203, and thus executes processing of storing image data in a storage medium such as the storage device 204. The storage device 204, functioning as an external storage device, stores the image data and the like, and can also act in place of the backup RAM 202 to store the counter information, system information, and monitoring information. The I/O device 210 receives user input (scanning, button input, and the like), and informs the processing units of the input through the I/O I/F 209.

A remaining amount detection unit 211 detects the remaining amount of consumable agent (such as toner and ink) in an attached consumable product (not illustrated) with a sensor, and generates a signal serving as an alert or an alarm corresponding to information indicating the amount. The management server 106 is notified of the information corresponding to the generated signal through a network such as the Internet.

A sensor unit 212 represents a plurality of different sensors each detecting information, such as detachment/attachment of components, an operation state, humidity, or temperature, in the image processing apparatus 102 or position information. In particular, the sensor unit 212 includes a sensor that detects attachment of a consumable product such as a toner bottle and detachment of the attached consumable product (not illustrated). In an image processing apparatus of a certain model, the sensor unit 212 can read the serial number of the mounted toner bottle with noncontact wireless communications, for example. However, the reading might fail for a toner bottle that has no read portion, that is dirty, or the like.

FIG. 2B is a diagram illustrating an example of a hardware configuration of the management server 106 according to the present invention.

The management server 106 includes a CPU 251 that executes a program stored in a ROM 253 and performs overall control of devices through an internal bus 256. A RAM 252, the ROM 253, a storage device 254, a network I/F 255, and an I/O I/F 257 are connected to the internal bus 256. For example, the I/O I/F 257 includes a PS/2 port, a universal serial bus (USB) I/F, and an analog or a digital display I/F. An I/O device 258 is a keyboard, a mouse, a cathode ray tube (CRT), a liquid crystal display, or the like, and can be connected to the management server 106 through the I/O I/F 257. The management server 106 uses the network I/F 255 to perform communications through the LAN 101, the intranet environment 107, the Internet 108, and thus can communicate with the image processing apparatus 102 and the PC 105. The CPU 251 executes a program (including a program related to processing illustrated in FIG. 7 described later) with the RAM 252 and the ROM 253. The CPU 251 also executes processing of storing image data in a storage medium such as the storage device 254. The storage device 254, functioning as an external storage device, stores management information of the image processing apparatus 102 and can also act in place of the backup RAM 252 to store system information and processing information.

FIG. 3 is a diagram illustrating an example of a software module configuration of each apparatus according to the present invention.

Figure 3A:
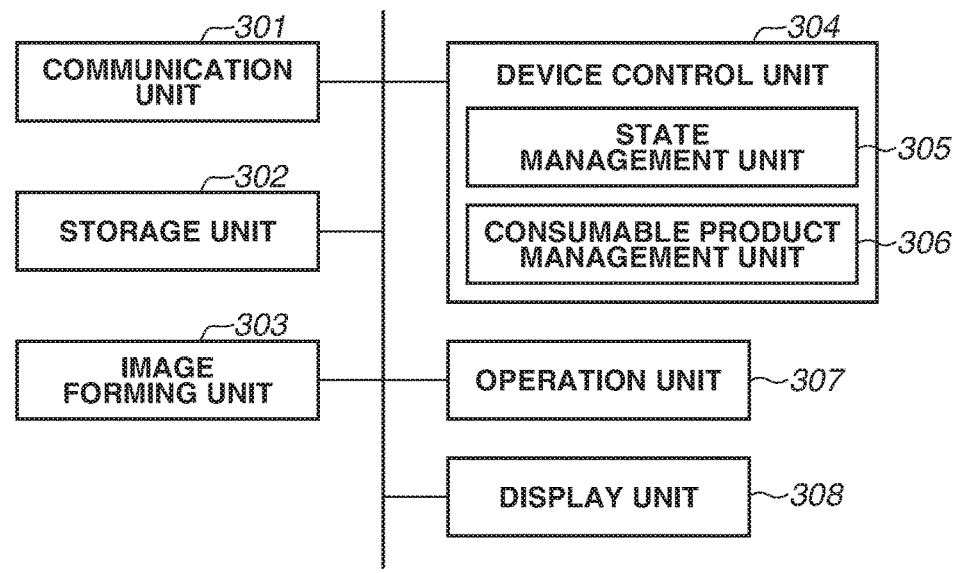
FIGS. 3A and 3B are each a diagram illustrating an example of a software module configuration of each apparatus according to the present invention.

FIG. 3A is a diagram illustrating a software module configuration of the image processing apparatus 102.

The image processing apparatus 102 includes a communication unit 301, a storage unit 302, an image forming unit 303, a device control unit 304, an operation unit 307, and a display unit 308. The image processing apparatus 102 further includes a state management unit 305 and a consumable product management unit 306 that are in the device control unit 304.

The communication unit 301 controls transmission of the device information, the operation information, and the like related to the image processing apparatus 102, to the management server 106 through the network I/F 205. The communication unit 301 also controls reception of an instruction and various types of information transmitted from the management server 106. The communications for the transmission and the reception are performed under a protocol such SMTP or HTTP/HTTPS. The storage unit 302 performs writing and reading to and from storage areas of the RAM 202, the ROM 203, and the storage device 204 and performs storage control. The image processing apparatus 102 stores information such as data and setting values related to image forming, the device information, the operation information including a status and a log, and the like. The device information includes identification information for identifying the apparatus. The identification information includes at least one of a device ID, a model, a product name, a product serial number, an Internet protocol (IP) address, and a media access control (MAC) address. The operation information includes various types of counter information indicating values counted in accordance with processing executed in the image processing apparatus 102 such as image forming, state information indicating abnormality, toner-low, and the like, and various types of log information stored while being associated with the result of the image forming and operation details. Furthermore, address information (IP address and the like) corresponding to the management server 106, information used for authentication, and the like are stored as information on the management server 106 serving as a destination of the operation information and the like. The image forming unit 303 has a function of generating print data and outputting the print data through the print unit 208 and the like.

The device control unit 304 includes the state management unit 305 and the consumable product management unit 306, and manages information that can be acquired from the print control unit 207, the remaining amount detection unit 211, the sensor unit 212, and the like, as well as notification information including the counter information that can be acquired through the storage unit 302. The device control unit 304 also performs control related to settings for various functions of the image processing apparatus 102 such as tint adjustment, print mode, and the like.

The state management unit 305 generates the failure information to be transmitted to the management server 106 when failure, abnormality, or the like occurs in the image processing apparatus 102. The state management unit 305 also generates information corresponding to the remaining amount of the recording agent in the consumable product and the component consumption level. More specifically, failure information indicating toner-low is generated when the toner remaining amount in the toner bottle serving as the consumable product, drops below a predetermined amount. The control is performed in such a manner that the generated failure information is transmitted to the management server 106 by the communication unit 301.

When the sensor unit 212 detects the serial number of a newly attached consumable product, the consumable product management unit 306 determines whether the attached consumable product is new, based on the detected information. When the consumable product management unit 306 determines that the attached consumable product is new, the history information, as a replacement history indicating detected date and time and the serial number, is stored in the storage unit 302. On the other hand, replacement information indicating repeated attachment/detachment of a single toner bottle is not stored as a history, or is stored as a replacement history corresponding to replacement information indicating the replacement with a used toner bottle. When replacement of a component with a new one or the like operation is performed, notification information to be transmitted to the management server 106 is generated by using information stored as history information.

The operation unit 307 is an interface with which an operation instruction, such as a print instruction from the user, through the I/O device 210 can be issued to the image processing apparatus 102. The display unit 308 displays appropriate information, including the state information of the information processing apparatus 102, setting information for the image forming, a processing result, and the like, to the user.

Figure 3B:
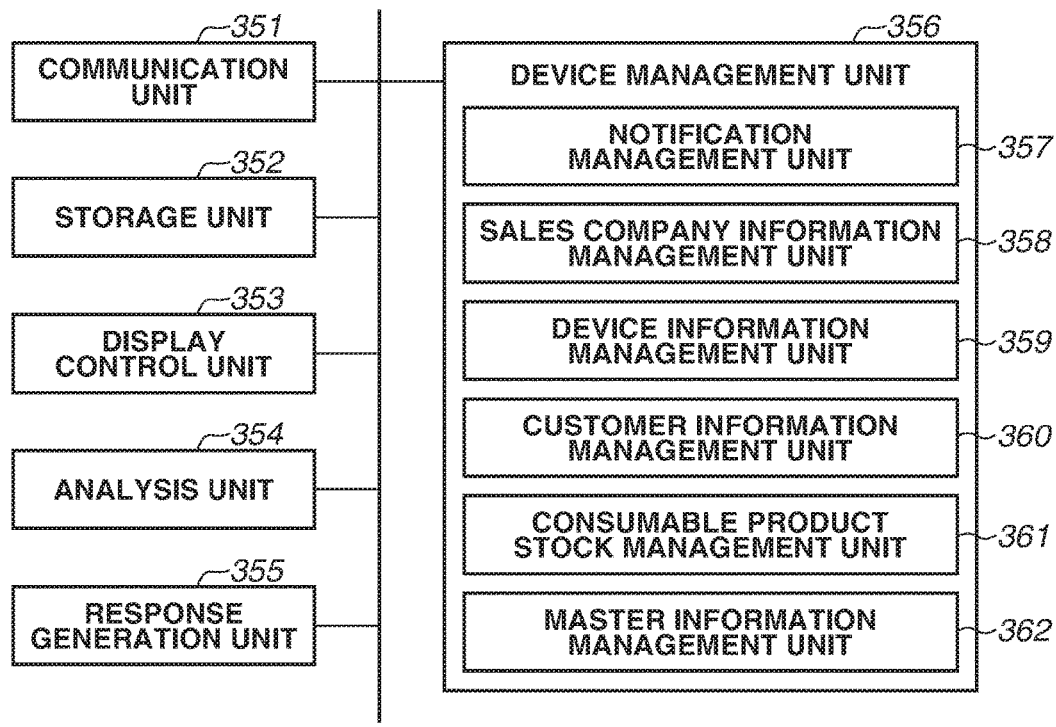

FIG. 3B is a diagram illustrating an example of a software configuration of the management server 106 according to the present invention. The management server 106 includes a communication unit 351, a storage unit 352, a display control unit 353, an analysis unit 354, a response generation unit 355, and a device management unit 356.

The communication unit 351 has a function for communicating with the image processing apparatus 102 through a network. More specifically, the communication unit 351 receives the device information and the operation information transmitted from the image processing apparatus 102 and transmits a required instruction and required information to the image processing apparatus 102. The received operation information includes the notification information generated by the image processing apparatus 102 as described above.

The storage unit 352 writes and reads information to and from the storage areas of the RAM 252, the ROM 253, and the storage device 254, and controls storing of the device information, the operation information, the customer information, and the like. The display control unit 353 provides information with a web page displayed on the external PC in various formats by using the information stored in the storage unit 352. A WWW server program operates in the management server 106, and the display control unit 353 provides the web page by using a web browser of a desired PC for a customer engineer related to a sales company selling the image processing apparatus 102, for example. The web page on which the device information, the operation information, the customer information, and the like can be checked is hereinafter referred to as a portal site.

The analysis unit 354 analyzes a command in the information transmitted from the image processing apparatus 102 and the content of the command. The analysis result is stored through the storage unit 352, and is reflected on outputs of the device management unit 356 and the display control unit 353 as appropriate. The response generation unit 355 generates a response to the image processing apparatus 102, as appropriate, for the command analyzed by the analysis unit 354. The generated response is transmitted to the image processing apparatus 102 through the communication unit 351.

The device management unit 356 includes a notification management unit 357, a sales company information management unit 358, a device information management unit 359, a customer information management unit 360, a consumable product stock management unit 361, and a master information management unit 362. The device management unit 356 has a function of monitoring one or more customers serving as the management targets of the management server 106 and the image processing apparatus(es) 102 that the one or more customer(s) has (have), and managing information required for stock management and for arranging for maintenance.

The notification management unit 357 generates notification information and designates a notification destination, and generates notification data. The notification includes a maintenance request notification to a service person that performs maintenance of the image processing apparatus 102 and a replenishment request notification for a consumable product. The sales company information management unit 358 manages information on the sales company that manages and supports the image processing apparatus 102 installed in the customer environment. The device information management unit 359 manages the device information and the operation information of the image processing apparatus 102 serving as the management target. The device information management unit 359 further manages a maintenance history of the image processing apparatus 102, manager information, information on the stock of the consumable product expected to be held on the customer side, and the like. The customer information management unit 360 manages information on the customer including the image processing apparatus 102. This information includes information related to a service contract concluded with the sales company.

The consumable product stock management unit 361 manages the stock of the consumable product, used in the image processing apparatus 102, such as a toner bottle and a consumable component. More specifically, based on the notification related to the consumable product transmitted from the image processing apparatus 102, the consumable product stock management unit 361 decrements the remaining stock quantity in stock information, on the side of the customer, managed by the device information management unit 359. When the remaining stock quantity drops below a threshold set for each customer, the consumable product stock management unit 361 operates with the notification management unit 357 to generate and issue the replenishment request notification for the consumable product. The replenishment request notification is generated in accordance with a content of the maintenance contract managed as the customer information.

The master information management unit 362 manages, as master information, all the information required for managing and displaying, such as model information, the failure information, the consumable product information, and the component information, for each of a plurality of the image processing apparatuses 102 serving as potential management targets. All basic information is managed in the master information. For example, the basic information includes, in the master information, a product name of a certain model, information on a consumable product to be used, explanation on the detail of the failure information transmitted from the image processing apparatus 102, a service life value of the component, and the like. The master information, managed by the master information management unit 362, may be stored in a storage service that is externally connected to the management server 106 through a network.

Figure 4A:
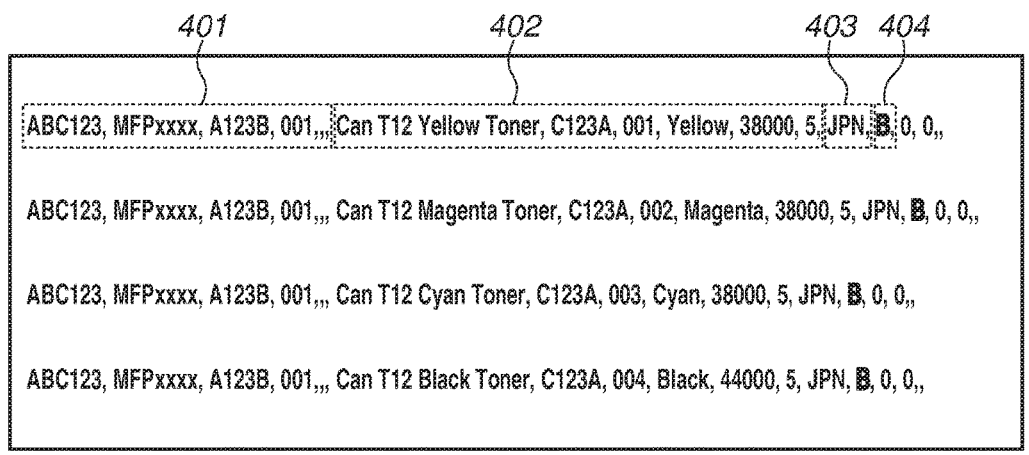
FIGS. 4A and 4B each illustrate an example of a file format for registering model information in a management server.

FIG. 4 illustrates an example of a file format used for registering the information on the image processing apparatus 102 that can serve as the potential management target of the management server 106, as the master information. FIG. 4A illustrates an example of a file including a description on model information of the image processing apparatus 102 managed by the master information management unit 363. This file may be in a format such as a comma-separated values (CSV) file. By uploading the file to the management server 106, the target model is registered in the master information so as to be usable in processing executed in the management server 106. The uploading is instructed by a person in charge in a manufacturing or sales company of the image processing apparatus.

A first line in FIG. 4A will be exemplarily described. A section 401 indicates that the image processing apparatus has "ABC123" as a model code, "MFPxxxx" as a product name, and "A123B001" as a product code. A section 402 indicates that the consumable product used in the image processing apparatus of this model is a toner bottle with "Can T12 Yellow Toner" as the name, "C123A001" as an identification code, "Yellow" as a color attribute, "38000" as a nominal number of printable sheets, and "5%" as a coverage indicating a printing ratio. A section 403 indicates a destination and includes "JPN" indicating that the image processing apparatus is of a Japanese model. In a section 404, a type of a notification for the consumable product, to be used in the stock management for this model, is designated. Specific examples of the type of the notification designated in the section 404 are described below. In the present invention, notifications other than the specific examples to be used in the stock management of the consumable product may be designated from the image processing apparatus.

A sign "B" indicates that a toner bottle count-up alarm (hereinafter, referred to as a TBC alarm) is designated. The TBC alarm is generated by the state management unit 305 when attachment of a toner bottle to the image processing apparatus 102 is detected, and is transmitted to the management server 106. The alarm will be described more in detail below with reference to FIG. 6C.

Figure 4B:
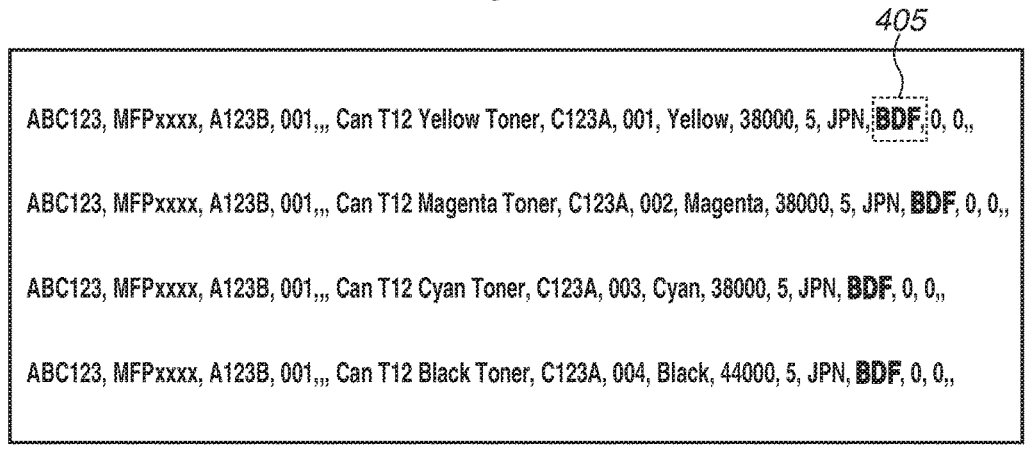

FIG. 4B illustrates another example of the file format described with reference to FIG. 4A. This format is different from that illustrated in FIG. 4A in a section 405 where a type of a notification, for a consumable product, to be used in the stock management is designated.

In FIG. 4B, three types of notifications are designated in the section 405. This means that the stock management can be implemented with any one of the notifications. It is possible to select and set on the portal site (FIG. 5) provided by the management server 106, which one of the notifications from the image processing apparatus is used in the stock management to be actually performed, such as decrementing of the remaining stock quantity. The type of the notification to be displayed by default on the portal site (FIG. 5) is determined in accordance with the designated order in the section 405. In this example, the default setting is "B" that is the leftmost sign.

The types of notifications, related to a consumable product, usable in the stock management that can be designated in FIGS. 4A and 4B will be further described.

A sign "F" represents a notification that is a toner-low alarm and represents a notification indicating that a state has been detected where the remaining amount of a recording agent in the consumable product (a toner bottle or a toner cartridge) attached to the image processing apparatus is small. This notification is a pseudo alarm generated by the management server 106 for the stock management in response to the generation of the alert indicating toner-low by the image processing apparatus. Alternatively, a configuration may be employed in which the image processing apparatus that has detected the toner-low generates the toner-low alarm and issues the alarm to the management server 106. The content of the notification includes the identification information for identifying the image processing apparatus, information indicating the type of the consumable product, counter information at the point where the notification is generated, and the like. A sign "D" represents a notification that is a preliminary toner-low alarm generated by the image processing apparatus at a predetermined timing before the remaining amount of the recording agent in the consumable product (the toner bottle or the toner cartridge) attached to the image processing apparatus becomes small. For example, the image processing apparatus generates this alarm, based on the number of printed sheets after the consumable product is attached, or by detecting, with a sensor and the like, that the remaining amount has dropped to a predetermined amount that is larger than the amount corresponding to the state indicating the toner-low. The content of the notification includes the identification information for identifying the image processing apparatus, the information indicating the type of the consumable product, the counter information at the point where the notification is generated, and the like. The preliminary toner-low alarm and the TBC alarm are not generated by an image processing apparatus of a certain model.

A toner bottle empty alarm is an alarm related to the toner bottle and is another type of the notification related to the consumable product. The image processing apparatus generates this notification when it is determined that there is no remaining recording agent in the toner bottle attached to the image processing apparatus. The content of the notification includes the identification information for identifying the image processing apparatus, the information indicating the serial number and the type of the toner bottle, the counter information at the point where the notification is generated, and the like.

The notifications, related to the consumable product, further includes a notification related to a consumable component. For example, the image processing apparatus has a mechanism of generating and issuing an alarm indicating that the replacement is required, as in the case of the toner-low alarm described above, when the consumption level of the consumable component exceeds a predetermined value. The consumption level is defined by a count value indicating the number of use times that is incremented each time the consumable component is used. The image processing apparatus also has a mechanism of generating and issuing an alarm indicating that the consumable component has been replaced, as in the case of the TBC alarm, when the consumable component is replaced. The TBC alarm and the alarm indicating that the consumable component has been replaced include information such as a sub code for determining whether the consumable product has been replaced with a new one. The image processing apparatus may have a mechanism of generating and issuing a preliminary alarm for arranging for delivery of the consumable component in advance, before the alarm indicating that the replacement is required is generated. Such a notification is also selectable as the notification used in the stock management through the portal site (FIG. 5) described below, as long as the registration information, illustrated in FIG. 4, includes the notification as an option.

FIG. 5 illustrates an example of the portal site provided by the management server 106 to the external PC. On a screen illustrated in FIG. 5, information related to the stock management can be set with reference to the customer information, information on the image processing apparatus owned by the customer, and the like. On the screen, the information on the image processing apparatus corresponding to the customer information is checked and registered as the management target, whereby the device information, the operation information, and the like transmitted from the image processing apparatus 102 to the management server 106 thereafter are accumulated.

A section 501 represents a setting item for selecting and setting a notification used in the stock management for the consumable product in the target image processing apparatus. On the illustrated screen, the stock management is selected to be performed based on the "preliminary toner-low alarm" described above. The "toner-low alarm" and the "TBC alarm", that have not been selected here, may be issued to the management server 106 from the image processing apparatus 102 but will not be used in the stock management. Still, the management server 106 may hold the received "toner-low alarm" and "TBC alarm" and provide the reception histories of the alarms as reference information through another screen.

On the screen illustrated in FIG. 5, the notification used in the stock management can be selected and set for each image processing apparatus registered as the management target. The type of the notification used in the stock management, registered while being associated with the image processing apparatus in the described exemplary embodiment, may be set by the customer. In this case, the type of the notification used in the stock management is managed as the customer information of a certain customer together with the maintenance contract. Furthermore, the type of the notification used in the stock management is managed while being associated with the image processing apparatus owned by the customer.

The sales company that performs the stock management in accordance with the contract concluded with the customer can select the notification used in the stock management through this screen, whereby a mechanism for a flexible stock management, performed in accordance with a customer and a model of an image processing apparatus, can be achieved.

For example, when a customer has no physical space for stocking the consumable products for the image processing apparatus, in the site of the customer, the customer uses the image processing apparatus without a stock of the consumable product. In such a case, to prevent downtime due to the running out of the consumable product of the image processing apparatus, the sales company needs to arrange for the delivery of a new consumable product before the toner-low or the toner-empty, indicating that the consumable product has run out, occurs. Thus, the preliminary toner-low alarm is selected as the type of the notification used in the stock management, and the management server 106 arranges for the delivery of the new consumable product in response to the notification of the preliminary toner-low alarm from the image processing apparatus of the customer.

On the other hand, the "toner-low alarm" or the "TBC alarm" is selected as the type of the notification used in the stock management for the customer having a physical space for stocking the consumable products of the image processing apparatus, in the site of the customer. The customer environment may include an image processing apparatus that cannot generate or issue the "TBC alarm". The "toner-low alarm" is selected for such an apparatus. When the management server 106 receives the notification such as the "toner-low alarm" or the "TBC alarm" from the image processing apparatus, the consumable product stock management unit 361 decrements the remaining stock quantity of the consumable product stocked by the customer. The management server 106 arranges for delivery of the new consumable product to the customer, when the remaining stock quantity drops below a threshold.

When the customer having the physical space for stocking the consumable product of the image processing apparatus 102, in the site of the customer performs mass printing, or when the space is relatively small, the stock management using the preliminary toner-low alarm as the notification may be performed for the customer or a part of the models owned by the customer.

FIG. 6 is a diagram illustrating information required for the stock management for the consumable product.

FIG. 6A illustrates a replacement history table 600 of the consumable product managed by the consumable product management unit 306 of the image processing apparatus 102. The replacement history table 600 is held in the storage device 204 in the image processing apparatus 102, and is used for managing information on replacement performed by attaching the new consumable product to the image processing apparatus 102.

A section 601 indicates information on time (year/month/day/time) at which the attachment of the new consumable product to the image processing apparatus 102 is detected. A section 602 indicates the identification information (serial number) of the new consumable product that has been attached. The image processing apparatus 102 to which a consumable product is attached refers to the serial number of the attached consumable product and the table 600 to determine whether the currently attached consumable product was attached in the past. When the serial number of the currently attached consumable product is not in the table 600, it is determined that the replacement has been performed with a new consumable product. Thus, the table 600 is updated by newly registering the information of the consumable product in the table 600. When the serial number of the currently attached consumable product is in the table 600, it can be determined that the consumable product that has been detached before the recording agent in the consumable product runs out is being reattached. The table 600 is not updated in this case.

FIG. 6B is a diagram illustrating the counter information counted when the consumable product is attached to the image processing apparatus 102. The image processing apparatus 102 manages the number of times the consumable product has been replaced by using the counter information. Upon determining that the new consumable product is attached, the image processing apparatus 102 increments a counter value of a counter number "1xx" by one. When an unidentifiable consumable product of which the identification information cannot be detected by the sensor unit 212 is attached, a counter value of a counter number "3xx" is incremented by one. When the consumable product having a predetermined amount of recording agent or more is detached in the consumable product replacement, it is determined that reusable detachment has been performed, and a counter value of the counter number "2xx" is incremented by one.

FIG. 6C is a diagram illustrating a notification generated by the consumable product management unit 306 when a consumable product is attached. Here, the TBC alarm (described above), generated when a toner bottle is attached for the toner bottle replacement, is described. Here, a relationship between an alarm code in the alarm generated by the state management unit 305 and the content of the detection by the image processing apparatus is described.

When it is determined that a new toner bottle has been attached to the image processing apparatus 102, alarm information with "1xxxxx-01xx" as an alarm code is generated. When it is determined that the toner bottle that has a content of a predetermined amount or more and thus is reusable has been detached, alarm information with "1xxxxx-02xx" as an alarm code is generated. When it is determined that an unidentifiable consumable product of which the identification information cannot be detected by the sensor unit 212 has been attached, alarm information with "1xxxxx-03xx" as an alarm code is generated.

The management server 106 that has received the notification including this alarm code can recognize that the notification is the TBC alarm from the first six-digit code, and can recognize the type of the consumable product attached in the replacement from the remaining four-digit sub code. The alarm codes are prepared for each color of toner in the toner bottle. The TBC alarm, transmitted to the management server 106, includes, in addition to the alarm code, the identification information of the image processing apparatus, the information indicating the time when the toner bottle is attached, and the three types of counter information illustrated in FIG. 6B. When the serial number of the mounted toner bottle can be detected, the TBC alarm may include the serial number.

FIG. 6D illustrates an example of a management table 610 used by the device information management unit 359 of the management server 106 for managing information related to the image processing apparatus 102. This table 610 is held in the storage unit 352.

A column 611 includes items of the device information and a column 612 includes registration information corresponding to each item. The table 610 represents a state where the "TBC alarm" has been selected and registered as the type (alarm for decrementing) of a notification used in the stock management for the image processing apparatus identified by a device ID "DEV00001". More specifically, the management server 106 executes processing related to the stock management when the TBC alarm is transmitted from an image processing apparatus identified with the device ID "DEV00001".

FIG. 7 is a flowchart illustrating processing related to the stock management by the management server 106.

FIG. 7A is a flowchart illustrating the entire stock management processing executed by the management server 106 based on the notification, related to the consumable product, transmitted from the image processing apparatus 102.

In step S701, the management server 106 receives a notification from the image processing apparatus 102 through the communication unit 351. In step S702, the analysis unit 354 of the management server 106 determines whether the received notification is an alert related to the consumable product. The alert related to the consumable product includes an alert indicating toner-low. When the received notification is the alert related to the consumable product (Yes in step S702), the processing proceeds to step S703. On the other hand, when the received notification is not the alert related to the consumable product (No in step S702), the processing proceeds to step S704. In step S703, the management server 106 internally generates the pseudo alarm related to the consumption level (the remaining amount of the recording agent and the like) of the consumable product. Here, the management server 106 generates, in place of the image processing apparatus 102, the pseudo alarm as an alarm corresponding to the stock management in response to the alert. The pseudo alarm, related to the remaining amount of the recording agent in the consumable product, includes a toner-low pseudo alarm generated from an alert indicating the toner-low. The pseudo alarm includes information indicating the toner-low, a part of the device information of the image processing apparatus 102 serving as the notification source, time information indicating the date and time at which the alert has been generated.

In step S704, the analysis unit 354 of the management server 106 determines whether the notification received in step S701 is an alarm. When the analysis unit 354 determines that the notification received in step S701 is not an alarm (No in step S704), the processing proceeds to step S705. In step S713, the management server 106 executes normal processing by using the notification received in step S701. As the normal processing, storage processing with a storage device such as a database (DB) for managing the device information and the like is executed in response to a notification of counter information, a notification not related to the consumable product including notification of failure information, and the like. In particular, the notification of failure information is processed by reflecting information indicating the failure on a display of a portal site for reporting the failure when the notification is received, by notifying the person in charge of the service of the failure through an e-mail, or by other like operations.

In step S705, the analysis unit 354 of the management server 106 determines whether the notification is an alarm related to the consumable product, based on the alarm code in the notification. When the analysis unit 354 determines that the alarm is the alarm related to the consumable product (Yes in step S705), the processing proceeds to step S706. On the other hand, when the analysis unit 354 determines that the alarm is not the alarm related to the consumable product (No in step S705), the processing proceeds to step S712. In step S712, the management server 106 executes normal alarm processing. More specifically, here, the processing of storing the content of the received alarm in the DB is executed. Furthermore, the content is reflected on the portal site and the person in charge of the service is notified of the content through an e-mail, as appropriate. For example, the toner bottle empty alarm described above is not used in the stock management, and thus is a notification as a target of the processing in step S712. When the toner bottle empty alarm is transmitted from the image processing apparatus, in step S712, an e-mail, indicating that the toner bottle attached to the image processing apparatus no longer contains the recording agent, is transmitted to a person managing the customer who owns the image processing apparatus.

In step S706, the consumable product stock management unit 361 of the management server 106 refers to the device information table 610 to check the type of the notification used in the stock management for the image processing apparatus 102 serving as the source of the notification received in step S701. The type of the notification used in the stock management is selected and set in the item 501 illustrated in FIG. 5. In step S707, the consumable product stock management unit 361 of the management server 106 determines whether the type of the alarm received in step S701 matches the type of the notification used in the stock management checked in step S706. When the types do not match (No in step S707), the processing proceeds to step S712. On the other hand, when the types match each other (Yes in step S707), the processing proceeds to step S708.

Figure 7B:
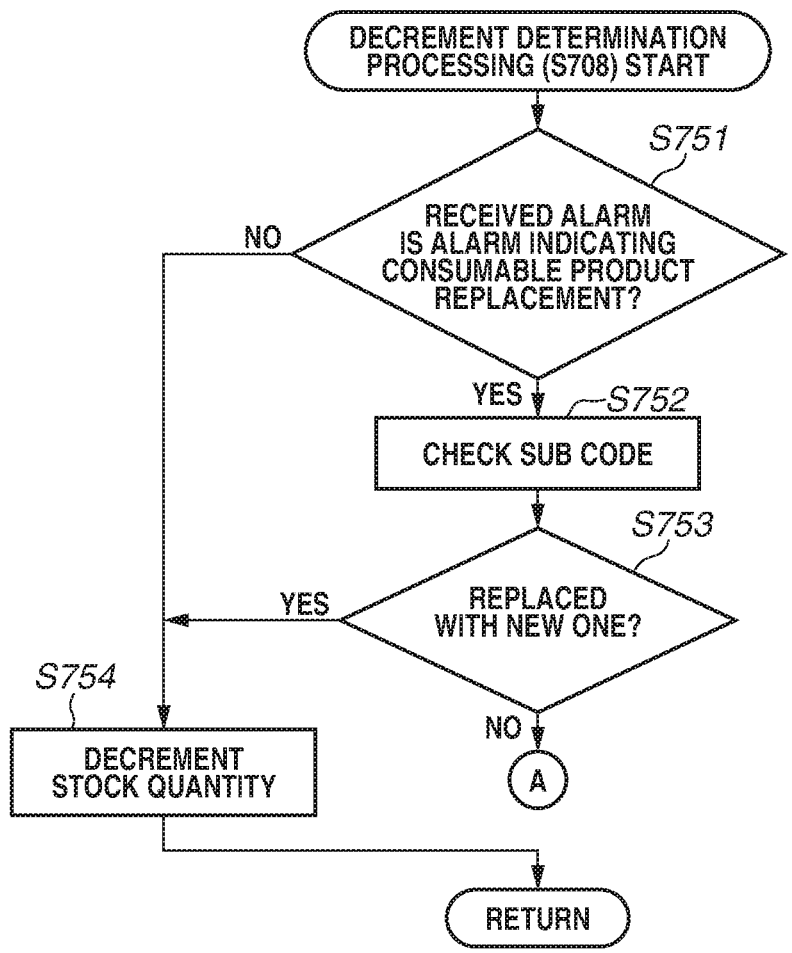

In step S708, the management server 106 executes consumable product stock quantity decrement determination processing that is described below with reference to FIG. 7B.

In step S751, the consumable product stock management unit 361 determines whether the received alarm is the alarm indicating the consumable product replacement, such as the TBC alarm. When the received alarm is the alarm indicating the consumable product replacement (Yes in step S751), the processing proceeds to step S752. On the other hand, when the received alarm is not the alarm indicating the consumable product replacement (No in step S751), the processing proceeds to step S754. In step S752, the consumable product stock management unit 361 checks the sub code of the alarm indicating the replacement of the consumable product. In step S753, the consumable product stock management unit 361 determines whether the replacement has been performed with a new consumable product, based on the sub code described above with reference to FIG. 6C for example. When it is determined in step S753 that the replacement has been performed with a new consumable product (Yes in step S753), the processing proceeds to step S754. On the other hand, when it is determined in step S753 that the replacement has not been performed with a new consumable product (No in step S753), the processing proceeds to step S712 in FIG. 7A.

In step S754, the consumable product stock management unit 361 decrements the remaining stock quantity of the consumable product (by one), managed while being associated with the customer who owns the image processing apparatus 102 serving as the source of the notification received in step S701. Thus, the decrement determination processing is terminated.

The remaining part of the processing in FIG. 7A is described below.

In step S709, the consumable product stock management unit 361 of the management server 106 determines whether the remaining stock quantity of the consumable product, managed while being associated with the customer who owns the image processing apparatus 102, is equal to or smaller than a threshold. The threshold is set in advance in such a manner that the consumable product is delivered at an appropriate timing in accordance with the customer contract. When the remaining stock quantity is determined to be equal to or smaller than the threshold in step S709 (Yes in step S709), the processing proceeds to step S710. On the other hand, when the remaining stock quantity is determined to be higher than the threshold in step S709 (No in step S709), the processing proceeds to step S711.

In step S710, the notification management unit 357 of the management server 106 provides the outside with information indicating that the remaining stock quantity of the consumable product is none or small. Specifically, the information is displayed on the portal site prepared for managing the stock quantity of the consumable product for each customer, to report the fact that the delivery of the consumable product is needed. Furthermore, an e-mail with the information, indicating that the remaining stock quantity of the consumable product is 0 or small, is transmitted to a person in charge of the service who arranges for the delivery of the consumable product to the customer. In step S710, the information may be displayed on the portal site or transmitted through the e-mail. In step S711, the notification management unit 357 provides information indicating that the consumable product has been replaced or the remaining stock quantity has decreased on the customer side, for the outside, in a manner similar to that in step S710.

In the present exemplary embodiment, an alarm related to the consumable product, other than the alarms set as the notification used in the stock management, is processed as the normal alarm, and thus is displayed as the normal alarm on the portal site. This display might cause the person in charge of the service and the like to misunderstand the timing to deliver the consumable product. To prevent this, a setting can be performed in such a manner that alarms other than the alarms set as the notification used in the stock management are not provided as information to the outside through the portal site and the like.

As described above with reference to FIG. 7, the configuration may be employed in which when the information is provided, only the alarm set as the notification used in the stock management, can be clearly identified even when displaying and notifying of all the alarms related to the consumable product, including the alarms other than the alarm set as the notification used in the stock management, are ON. Specifically, as illustrated in a section 801 in FIG. 8, a communication type of the alarm (the toner-low pseudo alarm in FIG. 8) set as the notification used in the stock management is displayed on the portal site as toner replacement. It can be clearly recognized in a section 802 in FIG. 8 that the communication type of the TBC alarm is "other (toner related alarm)" and thus the TBC alarm is an alarm unrelated to the consumable product replacement. Thus, the person in charge of the service can monitor the notification used in the stock management without any confusion by checking the attribute such as the communication type of the consumable product related alarm, and thus the consumable product can be prevented from being delivered at a wrong timing.

Application Example

In this application example, a mechanism enabling a person in charge of the service to recognize a state of use of a consumable product in a customer environment is described.

FIG. 9 illustrates a portal site provided by the management server 106 for the person in charge of the service. This portal side is an example of a screen related to a replacement history of a consumable product (a toner bottle in particular). This portal site provides information on a customer's consumable product storage location and the consumable product stored in the storage location, and information on a history of replacement of the consumable product performed so far, and a consumption level at the time of the replacement.

Specifically, FIG. 9 exemplarily illustrates a stock history of a toner bottle "Bottle K" in a stock storage location "Customer 35, office room". The stock history not only includes a history of a single image processing apparatus, but also includes histories of other image processing apparatuses using the same toner bottle as the target of the stock management in the same stock storage location.

A section 901 indicates the latest average number of sheets printed from when a single toner bottle is newly attached to when the single toner bottle is finally replaced, based on the consumption level (counter value indicating the number of printed sheets) when replaced. A section 902 indicates the difference in the counter value between points where the alarms, set as the notification used in the stock management in the section 501 in FIG. 5, have been transmitted. A section 903 indicates a serial number of the toner bottle that is detected by the consumable product management unit 306 at the timing when the toner bottle is attached as described above.

A history of an image processing apparatus with "EAQ00016" as the device ID is analyzed. A serial number of a toner bottle replaced at "2014 Jun. 10 15:58" is "SERIALNO4". A serial number of a toner bottle replaced at "2014 Jul. 16 13:23" is "SERIALNO5". The change in the serial number indicates that the replacement with a new toner bottle has been performed. The difference between the time points in the counter value, that is, the number of printed sheets of a single toner bottle is "14024" that is close to a nominal number of printable sheets "15000". All things considered, it can be recognized that the replacement has been performed after the print processing was performed for the number of times expected by the sales company.

Next, a history of an image processing apparatus with "MPQ00057" as the device ID is analyzed. This toner bottle has the serial number that is not in the history and thus the serial number of the toner bottle cannot be detected in this model. The difference in the counter value between the replacement point "2014 Jun. 7 18:44" and the replacement point "2014 Jun. 10 14:14" is "729", which is relatively small. All things considered, it can be recognized that the toner bottle is not replaced in a manner expected by the sales company in this model.

With the portal site illustrated in FIG. 9, for example, a usage tendency of a consumable product of each customer can be recognized, and thus the threshold used in step S709, for determining the delivering timing of the consumable product, can be appropriately adjusted.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-014650, filed Jan. 28, 2015, which is hereby incorporated by reference herein in its entirety.

What is claimed is:

1. A management system configured to manage an image processing apparatus, the management system comprising:
one or more processors; and
one or more memories storing instructions related to stock management of toner bottles for the image processing apparatus,
the instructions, when executed by the one or more processors, causing the management system to:
receive notification types information for the image processing apparatus identifying a plurality of types of notifications supported by the image processing apparatus for indicating toner level decrease or toner bottle replacement;
set a type of notification to be used in the stock management for the image processing apparatus, wherein the type of notification is selected from among the identified plurality of types of notifications;
receive a notification generated by the image processing apparatus, the notification indicating toner level decrease or toner bottle replacement;
determine whether the type of the received notification matches the set type of notification;
in a case where it is determined that the type of the received notification matches the set type of notification, even if the received notification indicates toner level decrease,
provide, to a user, an indication of toner bottle replacement in connection with reporting on the received notification, and
decrement a value corresponding to a remaining stock quantity of toner bottles based on the received notification; and
in a case where it is determined that the type of the received notification does not match the set type of notification, even if the received notification indicates toner bottle replacement,
provide, to the user, a different indication from toner bottle replacement in connection with reporting on the received notification, and
not decrement the value corresponding to the remaining stock quantity of toner bottles based on the received notification.

2. The management system according to claim 1, wherein the instructions, when executed by the one or more processors, further cause the management system to:
manage the received notification which is determined to match the set type of notification used in the stock management and counter information in the notification; and
provide, through a web page, information related to counter information for each replacement in a replacement history of toner bottles in the image processing apparatus and information indicating an average number of sheets printed by each replacement in the replacement history based on a plurality of the managed notifications and the managed counter information.

3. The management system according to claim 2, wherein, in the stock management, information related to difference information in counter value from a last replacement for each replacement in the replacement history is provided through the web page based on a plurality of the managed notifications and the managed counter information.

4. The management system according to claim 1, wherein a notification indicating toner level decrease includes at least one of a toner-low alarm indicating that a state has been detected where the remaining amount of a recording agent in a toner bottle used in the image processing apparatus is small and a preliminary alarm generated by the image processing apparatus at a predetermined timing before the remaining amount of the recording agent in the toner bottle becomes small.

5. The management system according to claim 1, wherein, in the stock management, when the set type of notification is a notification indicating toner bottle replacement and the received notification does not include information indicating replacement with a new toner bottle, the value corresponding to the remaining stock quantity of toner bottles is not decremented based on the received notification.

6. A management method performed in a management system configured to manage an image processing apparatus, the management method relating to stock management of toner bottles for the image processing apparatus, the management method comprising:

receiving notification types information for the image processing apparatus identifying a plurality of types of notifications supported by the image processing apparatus for indicating toner level decrease or toner bottle replacement;

setting a type of notification to be used in the stock management for the image processing apparatus, wherein the type of notification is selected from among the identified plurality of types of notifications;

receiving a notification generated by the image processing apparatus, the notification indicating toner level decrease or toner bottle replacement;

determining whether the type of the received notification matches the set type of notification;

in a case where it is determined that the type of the received notification matches the set type of notification, even if the received notification indicates toner level decrease, provide, to a user, an indication of toner bottle replacement in connection with reporting on the received notification, and decrement a value corresponding to a remaining stock quantity of toner bottles based on the received notification; and in a case where it is determined that the type of the received notification does not match the set type of notification, even if the received notification indicates toner bottle replacement, provide, to the user, a different indication from toner bottle replacement in connection with reporting on the received notification, and not decrement the value corresponding to the remaining stock quantity of toner bottles based on the received notification.

* * * * *